(12) United States Patent
Ferguson et al.

(10) Patent No.: US 11,756,007 B2
(45) Date of Patent: Sep. 12, 2023

(54) METHOD AND SYSTEM FOR OPEN-LOOP PERSON-TO-PERSON PAYMENTS

(71) Applicant: MASTERCARD INTERNATIONAL INCORPORATED, Purchase, NY (US)

(72) Inventors: Alan Ferguson, Dubai (AE); Ravi Kapoor, Dubai (AE); Sedef Acar, Dubai (AE); Mohammad Al-Hussein, Dubai (AE); Georgina Selby, Dubai (AE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 44 days.

(21) Appl. No.: 17/166,807

(22) Filed: Feb. 3, 2021

(65) Prior Publication Data

US 2021/0241239 A1    Aug. 5, 2021

(30) Foreign Application Priority Data

Feb. 4, 2020   (SG) .............................. 10202000987T

(51) Int. Cl.

| | |
|---|---|
| G06Q 30/00 | (2023.01) |
| G06Q 20/02 | (2012.01) |
| G06Q 20/22 | (2012.01) |
| G06Q 20/10 | (2012.01) |
| G06Q 20/32 | (2012.01) |
| G06Q 40/02 | (2023.01) |
| G06K 19/06 | (2006.01) |
| G06Q 20/36 | (2012.01) |

(52) U.S. Cl.
CPC ........... *G06Q 20/02* (2013.01); *G06Q 20/108* (2013.01); *G06Q 20/223* (2013.01);
(Continued)

(58) Field of Classification Search
CPC .................................................. G06Q 40/025
(Continued)

(56) References Cited

U.S. PATENT DOCUMENTS

2007/0255653 A1*  11/2007  Tumminaro ....... G06Q 20/3255
                                                        705/39
2009/0287601 A1   11/2009  Tumminaro et al.
(Continued)

OTHER PUBLICATIONS

ProQuestDialogNPL Search History.*
(Continued)

*Primary Examiner* — John H. Holly
(74) *Attorney, Agent, or Firm* — Harness, Dickey & Pierce, P.L.C.

(57) ABSTRACT

A method for open-loop person to person payments comprises: receiving, from a sender computing device, a transaction request message including an identifier of a recipient, a selection of a payment device, and a payment amount; determining, based on the identifier, a registration status of the recipient; if the recipient is registered: determining, from the identifier of the recipient, an account of the recipient, and initiating a request to a payment network to effect a transfer of the payment amount from an account associated with the selected payment device to an account of the recipient; if the recipient is unregistered, effecting a transfer of the payment amount from an account associated with the selected payment device to an escrow account, and transmitting, to the recipient based on the identifier, a payment notification message, said payment notification message including a link for the recipient to register to receive the payment amount.

10 Claims, 5 Drawing Sheets

(52) U.S. Cl.
CPC ......... *G06Q 20/3276* (2013.01); *G06Q 40/02* (2013.01); *G06K 19/06028* (2013.01); *G06K 19/06037* (2013.01); *G06Q 20/367* (2013.01)

(58) Field of Classification Search
USPC ...... 705/42, 1.1, 44, 40, 79, 38, 39; 455/406
See application file for complete search history.

(56) References Cited

U.S. PATENT DOCUMENTS

| | | |
|---|---|---|
| 2013/0159172 A1 | 6/2013 | Kim |
| 2014/0279457 A1* | 9/2014 | Green .................... G06Q 20/10 705/40 |
| 2015/0161589 A1 | 6/2015 | Snider |
| 2015/0254639 A1 | 9/2015 | Radu |
| 2015/0356547 A1 | 10/2015 | Abed |

OTHER PUBLICATIONS

Zelle (payment service); https://en.wikipedia.org/wiki/Zelle_(payment_service); web accessed Sep. 5, 2019; 7 pgs.

B2C Payments—A new Way to Pay; https://cdn.ymaws.com/www.mnafp.org/resource/resmgr/2016_Conference_Handouts/2016_4G_B2C_Payments_-_A_Ne.pdf; Apr. 26, 2016; 37 pgs.

Pay by cellphones?; https://www.fastcompany.com/90184528/pay-by-cellphone-sounds-great-so-why-dont-we-do-it; web accessed Sep. 5, 2019; 5 pgs.

* cited by examiner

METHOD AND SYSTEM FOR OPEN-LOOP PERSON-TO-PERSON PAYMENTS

CROSS-REFERENCE TO RELATED APPLICATION

This application claims the benefit of, and priority to, Singapore Patent Application No. 10202000987T filed on Feb. 4, 2020. The entire disclosure of the above application is incorporated herein by reference.

FIELD

The present disclosure relates to a method and a system for open-loop person-to-person (P2P) payments.

BACKGROUND

This section provides background information related to the present disclosure which is not necessarily prior art.

Electronic payments, using payment devices, such as credit cards or smartphones configured with payment functionality, are almost ubiquitous. In most cases this involves either in-store interactions between the payment device and a point-of-sale (POS) terminal capable of reading the payment device, or the secure transmission of payment-related information via a payment gateway or other online payment service provider.

The above payment modalities have obtained widespread acceptance for retail purchases with merchants who are equipped with the requisite payment infrastructure (e.g., terminals and/or connections to payment gateways). However, there are other situations in which individuals may wish to perform electronic payments, but for which such infrastructure is unsuited. Person-to-person (P2P) payments are a particular example. In a P2P payment, an individual seeks to transfer funds to another individual (who may be, but typically is not, a merchant). Typically, these fund transfers are low value.

An example of a low value payment that occurs regularly is tipping. Tipping is almost always conducted in cash, because there is currently no formal mechanism to directly send funds electronically to serving staff. The individual for whom the tip is intended may not even have an account to receive funds electronically. The use of cash causes challenges for the tipper, since he or she may not have sufficient small notes or coins to provide an appropriate tip, such that they may not tip at all, or may not tip as much as they wanted to.

Several P2P solutions have previously been proposed, but each has its drawbacks. For example, existing P2P platforms may require the sender or the recipient, or both, to be registered, and/or may operate in "closed-loop" fashion such that senders may need to deposit funds with the P2P platform before sending a payment to a recipient.

There remains a need for a P2P payment platform that facilitates electronic payments between individuals, especially for tips and other micro-payments.

SUMMARY

This section provides a general summary of the disclosure, and is not a comprehensive disclosure of its full scope or all of its features. Aspects and embodiments of the disclosure are set out in the accompanying claims.

Disclosed herein is a method for open-loop person to person payments comprising: (i) receiving, at a person to person (P2P) payments platform, a transaction request message from a sender computing device, the transaction request message including an identifier of a recipient, a selection of a payment device, and a payment amount; (ii) determining, based on the identifier of the recipient, that the recipient does not have an account registered with the P2P payments platform; (iii) initiating a request to a payment network to effect a transfer of the payment amount from an account associated with the selected payment device to an escrow account maintained at an acquirer system; and transmitting, to the recipient based on the identifier, a payment notification message, said payment notification message including a link for the recipient to register with the P2P payments platform to receive the payment amount.

The identifier of the recipient may be determined by scanning, with the sender computing device, an optical code that encodes at least the identifier of the recipient (and optionally other information that can be used for the transaction, such as a preferred amount of the transaction). The optical code may encode a URL of a payment webpage of the P2P payments platform.

The method may further comprise generating an account for the recipient at the acquirer system on registration of the recipient at the P2P payments platform. In such cases, the method may further comprise initiating a transfer of the payment amount from the escrow account to the generated recipient account.

In certain embodiments, the identifier of the recipient is a mobile phone number, an email address, or an account identifier for the recipient at a messaging service.

Also disclosed herein is a method for open-loop person to person payments comprising: (i) receiving, at a person to person (P2P) payments platform from a sender computing device, a transaction request message including an identifier of a recipient, a selection of a payment device, and a payment amount; (ii) determining, based on the identifier, a registration status of the recipient; (iii) if the recipient is registered: (a) determining, from the identifier of the recipient, an account of the recipient; and (b) initiating a request to a payment network to effect a transfer of the payment amount from an account associated with the selected payment device to an account of the recipient; (iv) if the recipient is unregistered, effecting a transfer of the payment amount from an account associated with the selected payment device to an escrow account, and transmitting, to the recipient based on the identifier, a payment notification message, said payment notification message including a link for the recipient to register an account at the P2P payments platform to receive the payment amount.

The method may further comprise, responsive to a determination that the recipient is unregistered, requesting generation of an account for the recipient at the acquirer system on registration of the recipient at the P2P payments platform. In certain embodiments, the method further comprises initiating a transfer of the payment amount from the escrow account to the generated recipient account.

The identifier of the recipient may be a mobile phone number, an email address, or an account identifier for the recipient at a messaging service.

Further disclosed herein is a system for open-loop person-to-person payments, comprising: a person to person (P2P) payments platform that is configured to: (i) receive, from a sender computing device, a transaction request message including an identifier of a recipient, a selection of a payment device, and a payment amount; (ii) determine, based on the identifier, a registration status of the recipient; (iii) responsive to a determination that the recipient is registered: (a) determine, from the identifier of the recipient, an account of the recipient; and (b) initiate a request to a payment network to effect a transfer of the payment amount from an account associated with the selected payment device to the account of the recipient; (iv) responsive to a determination that the recipient is unregistered, initiate a request to a payment network to effect a transfer of the payment amount from an account associated with the selected payment device to an escrow account maintained at an acquirer system, and transmit, to the recipient based on the identifier, a payment notification message, said payment notification message including a link for the recipient to register an account with the P2P payments platform to receive the payment amount.

The P2P payments platform may be further configured, responsive to a determination that the recipient is unregistered, to request generation of an account for the recipient at the acquirer system on registration of the recipient at the P2P payments platform.

In certain embodiments, the P2P payments platform is further configured to initiate a transfer of the payment amount from the escrow account to the generated recipient account.

In certain embodiments, the identifier of the recipient is a mobile phone number, an email address, or an account identifier for the recipient at a messaging platform.

The system may further comprise the sender computing device.

The sender computing device may be configured to determine the identifier of the recipient by scanning an optical code that encodes the identifier of the recipient. In certain embodiments, the optical code also encodes a URL of a payment webpage of the P2P payments platform.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Embodiments of the present disclosure will now be described, by way of non-limiting example, with reference to the drawings in which.

Corresponding reference numerals indicate corresponding parts throughout the several views of the drawings.

DETAILED DESCRIPTION

Figure 1:
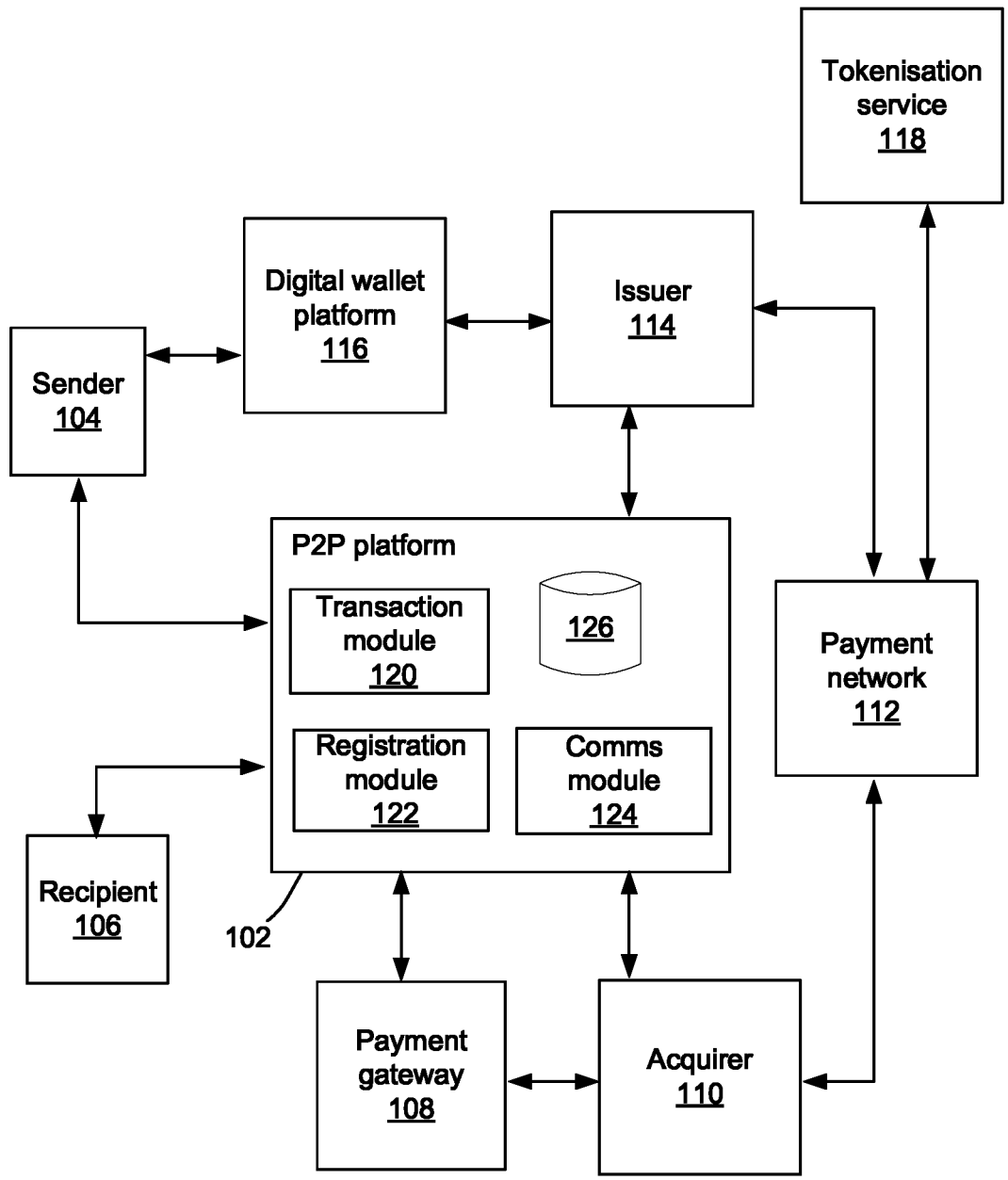
FIG. 1 is a block architecture diagram of an example system for open-loop P2P payments.

Embodiments will be described, by way of example only, with reference to the drawings. The description and specific examples included herein are intended for purposes of illustration only and are not intended to limit the scope of the present disclosure.

Embodiments of the present disclosure advantageously provide a mechanism for tippers to be able to send funds electronically to beneficiaries without needing to pre-register, for example using a barcode reader and web browser. According to certain embodiments, tippers can send money using their existing payment cards or mobile wallets. As such, the presently disclosed system is an "open-loop" system.

Recipients may be registered or un-registered, and may receive funds in a digital wallet or payment account. At least some embodiments may allow registered recipients to download, print or share a barcode, such as a QR code, with their account details or other identifying information, such that senders can scan the code to initiate a funds transfer into a nominated account of the recipient, or into a temporary account that is used to disburse funds in another manner, such as by issuance of a prepaid or virtual card onto which the funds are loaded.

An example payment system 100 that incorporates a P2P payments platform (referred to below as simply a "P2P platform") 102 for effecting an electronic funds transfer from a sender 104 to a recipient 106 is illustrated in schematic form in FIG. 1. The sender 104 may initiate the funds transfer from a computing device, for example a mobile computing device, such as a smartphone or smart watch, or a desktop or laptop computing device. The sender device 104 is configured in largely conventional fashion, and includes standard software components, such as a web browser. In some embodiments the sender device may also include a dedicated application, such as a mobile application (app) for interacting with the P2P platform 102. The sender device 104 also may include payment-related applications, such as a digital wallet application. Sensitive data of the digital wallet application may be stored in a secure element (SE) or trusted execution environment (TEE) of the sender device 104, for example.

The P2P platform 102 comprises one or more networked computing devices that cooperate to receive transaction requests from senders, and process the requests to effect transfers of funds to receivers. The one or more computing devices may include physical and/or virtual servers, such as application servers, web servers, database servers, mail servers, proxy servers, SMS gateways and the like; mobile computing devices; routing and switching devices; and storage devices.

Sender device 104 further includes standard hardware components, such as one or more processors, non-volatile storage (e.g., a hard disk drive or solid state drive), a display, user input means (which may include the display if it is a touch screen), and a camera. The camera may be used to capture images of optical codes, such as QR codes, for practising some embodiments.

Recipient 106 may also operate a computing device, such as a smartphone. As will be described in more detail below, the recipient device 106 may receive alerts relating to payments made by sender devices 104. In some cases the alerts may contain links to facilitate registration with P2P platform 102 for future transactions, and/or receipt of payments into an account nominated by the recipient (e.g., during a registration process).

The payment system 100 is depicted in FIG. 1 only in terms of components needed for a single transaction; in practice, and as will be discussed below, the payment system 100 may include many more instances of at least some components.

One component of the payment system 100 is a computer 116 operated by or on behalf of a wallet service provider (WSP). It is assumed that the WSP in question maintains a digital wallet for an individual user of the sender device 104. The WSP computer 116 may include a wallet services component and a transaction concentrator component. The wallet services component enrolls consumers for digital wallet services, and allows consumers' payment card accounts to be represented in digital form in the consumers' digital wallets to be maintained in the wallet services component. The wallet services component also serves as a repository and as a resource for digital wallet and payment card account information to be used in payment transactions. For example, a digital wallet transaction may be initiated by sender device 104 in cooperation with P2P platform 102 (which may take on the role of an e-commerce merchant), together with acquirer 110, wallet service provider 116, payment network 112, and issuer 114, for example, substantially in accordance with the process disclosed in US Patent Publication No. 2015/0254639 in the name of Mastercard International Incorporated, the contents of which are incorporated by reference herein in their entirety.

Also shown in FIG. 1, and forming part of the payment system 100, are a payment network 112 and an issuer server computer 114. Operation of the payment system 100 does not necessarily require that the payment network 112 and the issuer server computer 114 be operated in other than a conventional manner, and thus the payment network 112 and the issuer server computer 114 may be constituted in a known manner; it should be noted though that in effect, and as will be seen, the WSP computer 116 may serve (among other roles) in the place of the acquirer computer 110 that is depicted in FIG. 1. Thus, the payment network 112 may receive authorization requests from the WSP computer 116 as if (from the point of view of the payment network 112) the WSP computer 116 were an acquirer computer.

As will be understood, the payment system 100 may process many transactions, including simultaneous transactions. A considerable number of payment card account issuers may be included in the payment system 100, and the payment system 100 may also include a considerable number of acquirers/PSPs and their computers. Also, there may be a very large number of payment-enabled mobile devices as described herein, and owned/used by numerous individual users. The users are holders of payment card accounts issued by issuing financial institutions and have enrolled with one or more WSPs, which maintain digital wallets for the users.

Payment system 100 may also include a tokenisation service 118. The tokenisation service 118 communicates with issuer computer 114, and receives requests from issuer computer 114 to substitute personal account numbers (PANs) of payment cards with proxy values called tokens that have the same format, but which cannot be used by bad actors to obtain the real PANs to commit fraud. The tokens are stored in a token vault of the tokenisation service 118. In addition, a copy of the token may be stored on a sender device 104 in association with a digital wallet application executing on the sender device 104. During a digital wallet transaction, it is the token that is transmitted to P2P platform 102. When the transaction authorization request is routed through acquirer system 110 and payment network 112, the payment network 112 may then communicate with tokenisation service 118 to obtain the PAN to which the token is mapped, to thereby route the transaction authorization request to the issuer 114 for approval.

The P2P platform 102 includes a transaction management module 120 for processing transaction requests received from sender devices 104, an account management module 122 for registering and checking the registration status of recipients 106, and a communication module 124 for transmitting alerts and other notifications to sender devices 104 and recipient devices 106. P2P platform 102 also includes at least one database 126 for storing user account information. The at least one database 126 may also store transaction information relating to transaction requests submitted by sender devices 104, and to one or more escrow accounts to which funds have been transferred as a result of successful transaction requests.

Figure 2:
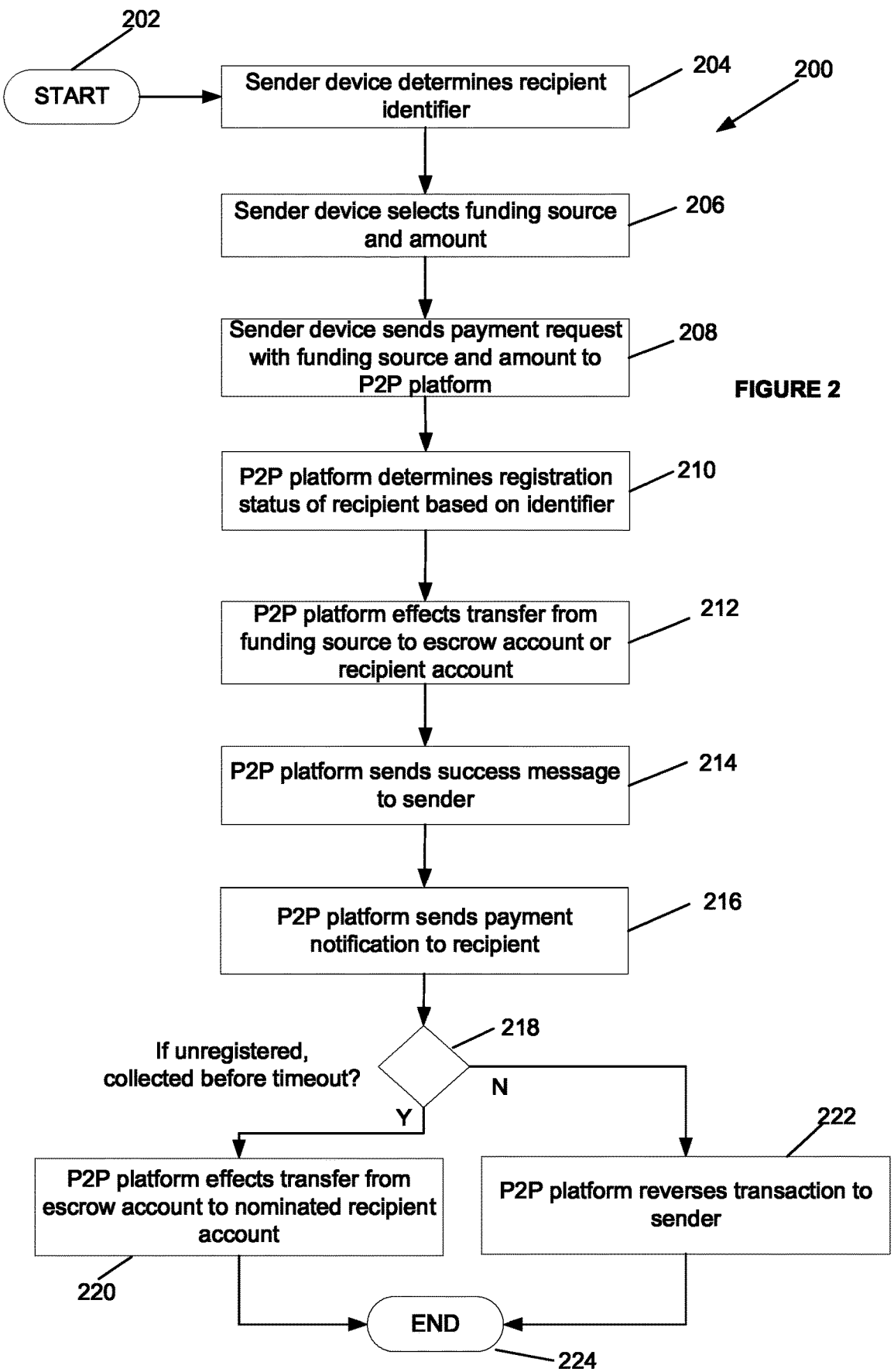
FIG. 2 is a flow diagram of an open-loop P2P payment method according to certain embodiments.

Referring now to FIG. 2, an example method 200 for open-loop P2P payments will be described. The method 200 will be described with reference to a sender making a payment to a recipient, who may be a server in a restaurant or other like establishment, and to whom the sender wishes to pay a tip.

At block 202, the method begins. Method 200 may be initiated by the sender browsing to a payment page of the P2P platform 102, or starting a mobile payment application that enables communication with P2P platform 102, for example.

At block 204, the sender device 104 determines an identifier for the recipient. This may be done in a number of ways. For example, the payment page served to, or the mobile payment application executing on, sender device 104 may prompt the sender to enter a mobile phone number, email address, or other communications identifier of the recipient, such as an account identifier of the recipient at a messaging service (e.g. WhatsApp, WeChat, LINE, Facebook Messenger, etc.). Alternatively, the sender may scan, using a camera of sender device 104, an optical code (such as a QR code) which is affixed to a badge or other substrate and worn by the recipient, or which is carried on some other physical medium that the recipient holds for identification purposes, such as an identification card. In some embodiments, scanning of the optical code may simply populate a text entry field in the browser or mobile application executing on sender device 104. In other embodiments, it may automatically trigger redirection of the browser to a web server of P2P platform 102, such that the scanning operation both initiates the method 200 and causes population of at least some data for use in method 200.

At block 206, a funding source and payment amount are selected at the sender device 104. The amount is typically entered by the sender, for example into a text entry field of the payment page served by the P2P platform 102, or into the above-mentioned mobile payment application. Details of the funding source may also be entered manually into the payment page or mobile application. For example, the payment page may have text entry fields to enable entry of a primary account number (PAN), expiry date, and card verification code (CVC) of a payment card. Alternatively, the funding source may be selected within a digital wallet application executing on the sender device 104, and the payment may be completed as a digital wallet transaction. Importantly, any existing funding source may be selected by the sender 104, and the sender 104 does not need to register an account with the P2P platform 102.

At block 208, the sender device 104 forms a payment request message that includes the funding source details, the payment amount, and the recipient identifier, and sends the payment request message to the P2P platform 102.

At block 210, the P2P platform 102 receives the payment request message, and analyses the message to obtain the recipient identifier. The P2P platform 102 then checks the registration status of the recipient, based on the identifier.

For example, the P2P platform 102 may search database 126 to determine whether the identifier is associated with any existing recipient account.

At block 212, the P2P platform takes action dependent on the registration status of the recipient determined at block 210.

If the recipient is not registered in database 126, the P2P platform 102 may initiate a transaction for the requested payment amount from the funding source specified by sender device 104, to an escrow account that is maintained at acquirer system 110. To this end, P2P platform 102 may transmit a transaction authorization request via payment gateway 108 to the acquirer system 110, which routes the request to payment network 112. Payment network 112 then routes the request to the sender's issuer 114 for authorization in known fashion, based on the PAN of the payment card selected by the sender. Successful authorization and subsequent clearing results in the requested payment amount being credited to the escrow account at acquirer 110. The escrow account temporarily retains funds on behalf of the intended recipient, until a destination account associated with the recipient becomes available (e.g., by the recipient creating such an account, or providing details of an existing account to which funds can be disbursed). The P2P platform 102 may also write, to database 126, details of the transaction, including a timestamp, a transaction identifier, and the amount, to enable tracking of the transaction and if necessary, a transaction reversal, in the event that the recipient does not collect the funds within a certain time.

If the recipient is registered in database 126, then payment may be effected by the P2P platform 102 in various ways. For example, if the recipient has a bank account or payment card account registered in association with their account in database 126, P2P platform 102 may initiate a standard payment card transaction to the bank account or payment card account, using payment card details of the sender as provided with the payment request message from the sender device 104. In one example, the acquirer system 110 may maintain accounts on behalf of recipients registered in database 126 of P2P platform 102. Accordingly, similarly to before, P2P platform 102 may transmit a transaction authorization request via payment gateway 108 to the acquirer system 110, which routes the request to payment network 112. Payment network 112 then routes the request to the sender's issuer 114 in known fashion, based on the PAN of the payment card selected by the sender. Successful authorization and subsequent clearing results in the requested payment amount being credited to the recipient's account at acquirer 110.

In either case, at block 214, on successful authorization of the transaction request, the P2P platform 102 transmits a transaction notification to the sender device 104.

At block 216, the P2P platform 102 also transmits a transaction notification to the recipient. The form of the transaction notification, and the manner of its sending, may depend on the registration status of the recipient.

If the recipient is registered, the P2P platform 102 may simply notify the recipient, for example via a mobile phone number or email address associated with the recipient's account, that a payment has been received for the requested amount (this may or may not identify the sender). The recipient may then check that the funds have been received into their nominated account (e.g., a bank account or payment card account, or the account maintained at acquirer system 110).

If the recipient is unregistered, the notification sent to the recipient 106 may include a link or other active element that is selectable by the recipient to initiate a connection to the P2P platform 102, to register for an account at P2P platform 102 and thereby collect the funds that have been deposited in the escrow account at acquirer 110. For example, if the recipient is identified by their mobile phone number (of recipient device 106), the notification may be an SMS message sent to the identified mobile phone number, and may include a link to a registration page of the P2P platform 102.

Decision block 218 includes determining whether the recipient is unregistered, and if so, whether a timeout period (e.g., one week, one month, six months, etc.) has expired. For example, each transaction may have a timeout period associated with it, such that the recipient failing to collect funds within the timeout period results in a reversal of the transaction.

For example, if the link, or other active element in the notification, is selected within the timeout period, then at block 220, the recipient 106 may complete a registration process. Completing the registration process at P2P platform 102 may trigger the creation of an account for the recipient at acquirer system 110, to which the requested payment amount is transferred from the escrow account. Alternatively, the registration process may enable the recipient to register an existing account, such as a bank account or payment card account (identified by a PAN of the payment card), and on completion of registration, the P2P platform 102 may request transfer of funds from the escrow account to the nominated existing account.

In some embodiments, instead of funds merely being transferred into an account at acquirer system 110, the recipient may be provided with the ability to have funds loaded onto a prepaid card or virtual card. The prepaid card or virtual card is still associated with an account at the acquirer system 110, but advantageously, provision of a prepaid card and/or virtual card makes it easier for the recipient to immediately use the funds for online or (once the prepaid card is delivered) in-person transactions. Once a prepaid card or virtual card is issued, the recipient may opt to have that card as their nominated account for future payments, so that any such payments are automatically used to reload the prepaid card or virtual card.

Once registration is complete, the P2P platform 102 may generate an optical code, such as a QR code, which the recipient can download and/or print for future use. The optical code may encode the recipient's identifier at the P2P platform 102 (e.g., mobile phone number, or a newly created identifier associated with the created recipient account), and may also, or alternatively, encode details of the recipient's nominated account for receiving funds. To this end, to increase security, the P2P platform 102 may encode only a partial account number that is sufficient to identify the recipient to P2P platform 102.

If the link or other active element is not selected within the timeout period, then at block 222, the P2P platform 102 may reverse the transaction. For example, P2P platform 102 may periodically monitor for incomplete transactions (that is, transactions for which the recipient has not completed collection) in database 126, and if any such transaction is detected, effect a transfer from the escrow account at acquirer system 110 to the account of the sender 104 who initiated the transaction.

At block 224, the method 200 ends.

Two specific use cases will now be described with reference to FIGS. 3 and 4.

Figure 3:
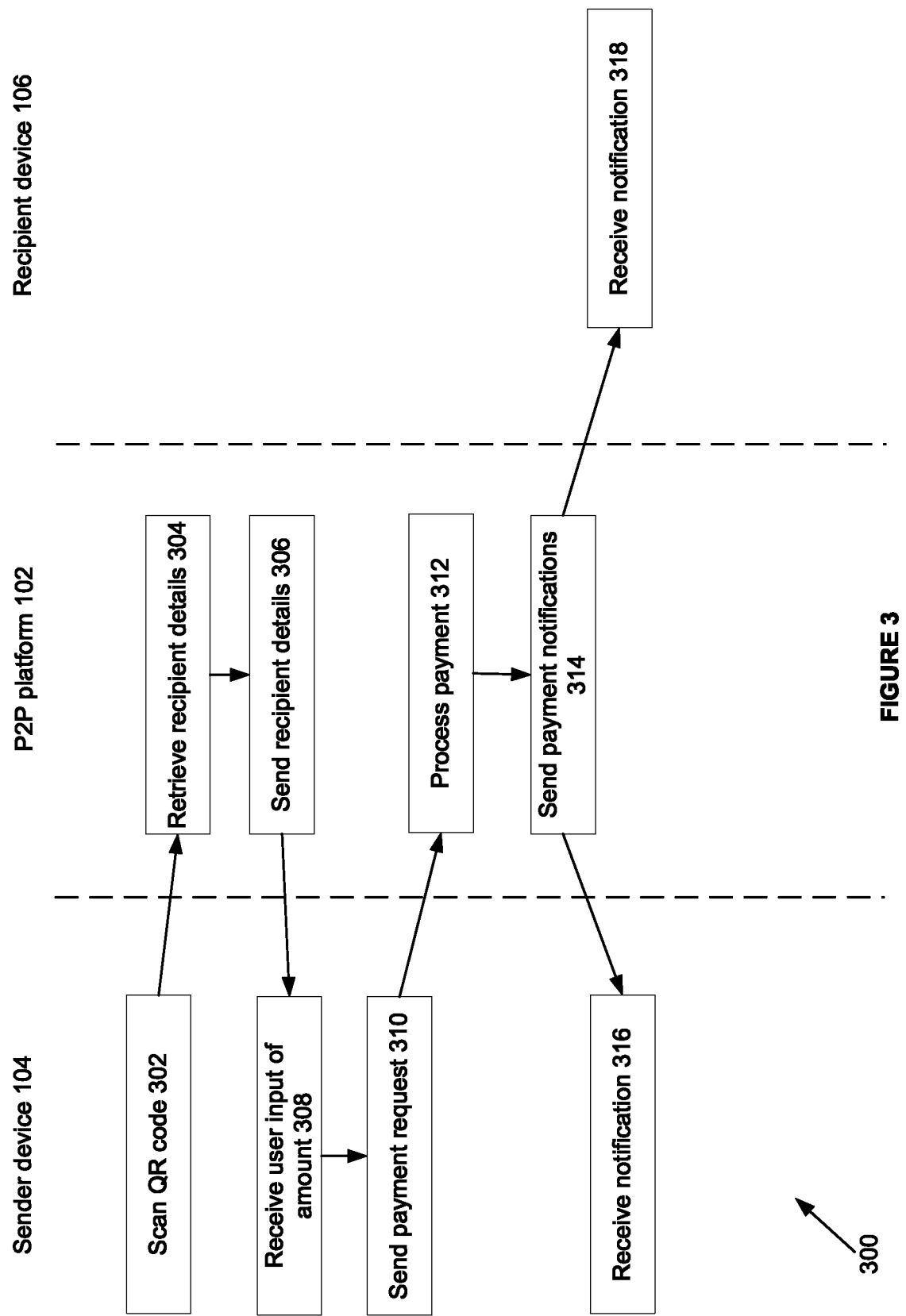
FIG. 3 is a swimlane diagram of operations performed in one embodiment of the method of FIG. 2.

FIG. 3 is a swimlane diagram of a P2P payment method 300 suitable for a sender 104 to make a payment, such as a tip, to a registered recipient 106. The registered recipient 106 is in possession of a QR code that encodes details sufficient to identify the recipient at the P2P platform 102.

The method 300 includes, at block 302, the sender device 104 scanning a QR code that is presented by the recipient 106. For example, the QR code may be applied to a badge or other item worn by the recipient. The QR code encodes an identifier of the recipient, and may also encode the URL of a payment webpage of the P2P platform 102. The sender device 104 may then transmit the identifier of the recipient to the P2P platform 102. For example, in response to the scanning of the QR code and the consequent detection of the URL of the payment webpage, the sender device 104 may initiate a browser application which sends a request to a web server executing at P2P platform 102.

At block 304, the P2P platform 102 (e.g., via the web server) receives the recipient identifier retrieved from the QR code. P2P platform 102 may then retrieve, from database 126, details of the recipient based on the identifier, such as the recipient's first name, the recipient's mobile phone number, and the account number of the recipient at acquirer system 110. The details of the recipient may also include a preferred tip amount (e.g. a fixed dollar amount, or a percentage). In some embodiments, the details of the recipient may also include a rating provided by previous senders, which may be derived from an average tip amount, or may be an average of a separate rating that is entered by senders/tippers when completing tip payments.

At block 306, some or all of the recipient's details retrieved by the P2P platform 102 may be transmitted to the sender device 104. For example, the web server of P2P platform 102 may serve, to sender device 104, a payment webpage that is partly pre-populated with the first name of the recipient, thus allowing the sender 104 to check that the actual recipient is the intended recipient.

At block 308, the sender device 104 may receive a desired tip amount, for example, by the sender entering the tip amount in a text entry field of the payment webpage. The sender device 104 may also receive a selection of a funding source for the payment. This may be by manual entry of a payment card number in a text entry field of the payment webpage, for example, or may be via a digital wallet application executing on the sender device 104.

At block 310, the sender confirms the payment for the desired tip amount at sender device 104, and sends the payment request to P2P platform 102. For example, the sender may click or tap a "confirm payment" button at the payment webpage, which causes a payment request that includes the payment card number (for example) and the payment amount to be sent to P2P platform 102 over a secure connection.

At block 312, the P2P platform 102 receives the payment request from sender device 104, and processes the payment. To do so, it forms a transaction authorization request that includes the payment card number of the sender, the payment amount, and the previously retrieved account number of the recipient. The transaction authorization request may also include other information that is typical of such requests, as known in the art, and may be formatted as an ISO 8583 or ISO 20022 message, for example.

Still as part of block 314, the P2P platform 102 sends the generated transaction authorization request to payment gateway 108, which routes it to the acquirer system 110. The acquirer system routes the request to payment network 112, which in turn routes it to the sender's issuer 114 for approval, based on the payment card number in conventional fashion. Assuming that the request is approved, a transaction approval message is returned to the acquirer 110 from the issuer 114 via the payment network 112, and then reaches the P2P platform 102 via payment gateway 108. Following approval of the transaction request, a conventional clearing and settlement process may occur, following which the payment amount is deposited in the account of the recipient (for example, at acquirer system 110).

On receipt of the approval message, at block 314 the P2P platform 102 sends a notification to the sender device 104, typically via the payment webpage, and the sender device 104 receives the notification at block 316. A notification may also be sent by other means, for example, by the sender's issuer 114 via email or SMS, for example. The P2P platform 102 also sends a notification to the recipient device 106, which receives the notification at block 318, and the process 300 ends.

Figure 4:
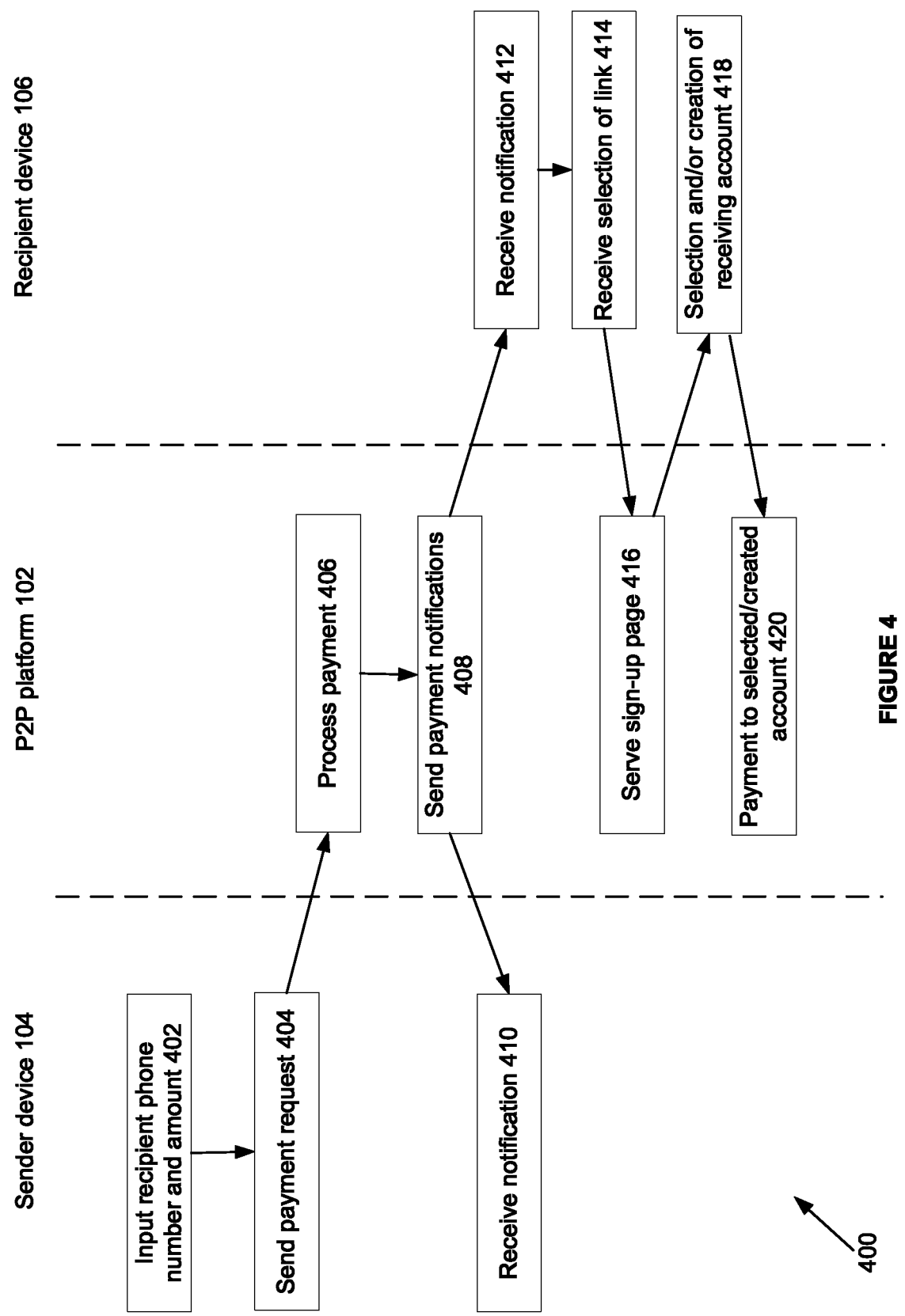
FIG. 4 is a swimlane diagram of operations performed in another embodiment of the method of FIG. 2.

FIG. 4 is a swimlane diagram of another P2P payment method 400 suitable for a sender 104 to make a payment, such as a tip, to an unregistered recipient 106. In contrast to method 300, the method 400 is not initiated by the sender 104 scanning a QR code, but is instead initiated manually, by the sender entering information into a payment webpage or into a mobile application executing on the sender device 104.

At block 402, a payment webpage is served to the sender device 104, and the sender inputs the recipient's identifier (typically, a mobile phone number) and a tip amount into respective text entry fields of the payment webpage. The payment webpage or mobile application may provide an option, e.g., via a payment button, for the sender to make the payment via a digital wallet. Alternatively, a further text entry field may be provided in the payment webpage for manual entry of a payment card number.

At block 404, on receiving confirmation in the payment webpage that payment is to proceed, a payment request is transmitted from the sender device 104 to the P2P platform 102. For example, the sender may click or tap a "confirm payment" button at the payment webpage, which causes a payment request that includes the payment card number (for example) and the payment amount to be sent to P2P platform 102 over a secure connection.

At block 406, the P2P platform 102 receives the payment request from sender device 104, and processes the payment. To do so, it forms a transaction authorization request that includes the payment card number of the sender, the payment amount, and an account number of an escrow account that is maintained at the acquirer system 110. The transaction authorization request may also include other information that is typical of such requests, as known in the art, and may be formatted as an ISO 8583 or ISO 20022 message, for example.

Still as part of block 406, the P2P platform 102 sends the generated transaction authorization request to payment gateway 108, which routes it to the acquirer system 110. The acquirer system routes the request to payment network 112, which in turn routes it to the sender's issuer 114 for approval, based on the payment card number in conventional fashion. Assuming that the request is approved, a transaction approval message is returned to the acquirer 110 from the issuer 114 via the payment network 112, and then reaches the P2P platform 102 via payment gateway 108. Following approval of the transaction request, a conventional clearing and settlement process may occur, following which the payment amount is deposited in the escrow account.

On receipt of the approval message, at block 408 the P2P platform 102 sends a notification to the sender device 104, typically via the payment webpage, and the sender device 104 receives the notification at block 410. A notification may also be sent by other means, for example, by the sender's issuer 114 via email or SMS, for example.

The P2P platform 102 also sends a notification to the recipient device 106, which receives the notification at block 412. In contrast to the recipient notification in FIG. 3, the recipient notification received at block 412 includes a link to a registration URL of the P2P platform 102, to enable the recipient to collect the payment amount.

At block 414, the recipient device 106 receives a selection of the link in the notification message, and directs a web browser of the recipient device 106 to a sign-up page (block 416).

At block 418, the recipient registers for an account at the P2P platform 102, and as part of the registration process, may enter details of an existing payment card or bank account which is to be used to receive the payment amount, or may request creation of an account. If the latter, the P2P platform 102 requests creation of an account at the acquirer system 110, and stores the account number in database 126 in association with the recipient's P2P platform account.

At block 420, the P2P platform 102 effects payment from the escrow account to the account nominated by the recipient, or if an account has been created for the first time at the acquirer system 110, to the newly created account. As mentioned above, the P2P platform 102 may request that the acquirer system 110 issue a virtual card and/or prepaid card that is, or are, to be associated with the newly created account.

Figure 5:
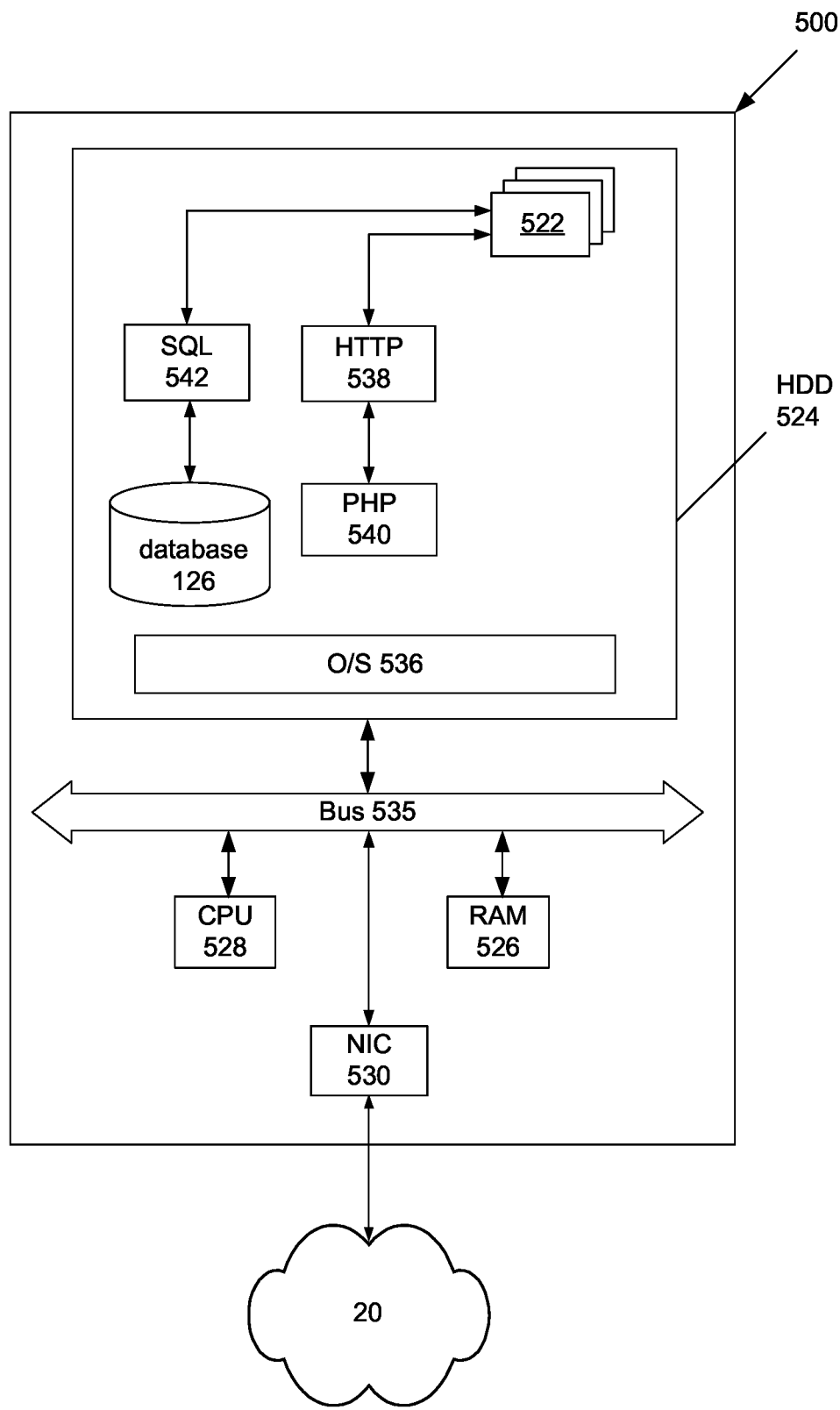
FIG. 5 illustrates a block architecture of an example P2P platform according to certain embodiments.

Turning now to FIG. 5, an exemplary architecture of a computing device 500 suitable for implementing a P2P platform 102 is shown.

The components of the computing device 500 can be configured in a variety of ways. The components can be implemented entirely by software to be executed on standard computer server hardware, which may comprise one hardware unit or different computer hardware units distributed over various locations, which may communicate over a network. Some of the components, or parts thereof, may also be implemented by application specific integrated circuits (ASICs) or field programmable gate arrays.

In the example shown in FIG. 5, the computing device 500 is a commercially available server computer system based on a 32 bit or a 64 bit Intel architecture, and the processes and/or methods executed or performed by the computing device 500 are implemented in the form of programming instructions of one or more software components or modules 522 stored on non-volatile (e.g., hard disk) computer-readable storage 524 associated with the computing device 500. At least parts of the software modules 522 could alternatively be implemented as one or more dedicated hardware components, such as application-specific integrated circuits (ASICs) and/or field programmable gate arrays (FPGAs).

The computing device 500 includes at least one or more of the following standard, commercially available, computer components, all interconnected by a bus 535: (a) random access memory (RAM) 526; (b) at least one computer processor 528; and (c) a network interface connector (NIC) 530 which connects the computer device 500 to a data communications network (such as network 20) and/or to external devices.

The computing device 500 includes a plurality of standard software modules, including: (a) an operating system (OS) 536 (e.g., Linux or Microsoft Windows); (b) web server software 538 such as Apache, available at www.apache.org; (c) scripting language support 540 such as PHP, available at www.php.net, or Microsoft ASP; and (d) structured query language (SQL) modules 542 (e.g., MySQL, available from www.mysql.com), which allow data to be stored in and retrieved/accessed from an SQL database 126.

Together, the web server 538, scripting language module 540, and SQL module 542 provide the P2P platform 102 with the general ability to allow users of the Internet 20 with standard computing devices equipped with standard web browser software to access the P2P platform 102 and in particular to provide data to and receive data from the database 126.

However, it will be understood by those skilled in the art that the specific functionality provided by the P2P platform 102 to such users is provided by scripts accessible by the web server 538, including the one or more software modules 522 implementing the processes, and also any other supporting scripts and data (not shown), including mark-up language (e.g., HTML, XML) scripts, PHP (or ASP), and/or CGI scripts, image files, style sheets, and the like.

Advantageously, the database 126 forms part of the computer readable data storage 524. Alternatively, the database 126 is located remote from the computing device 500 shown in FIG. 5.

The boundaries between the modules and components in the software modules 522 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the disclosure. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of those parts of the processes 200, 300 or 400 performed by the P2P platform 102 may be executed by a module (of software modules 522) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

For example, the modules 522 may include transaction module 120, registration module 122, and communication module 124 as shown in FIG. 1.

The computing device 500 normally processes information according to a program (a list of internally stored instructions, such as a particular application program and/or an operating system) and produces resultant output information via input/output (I/O) devices 530. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for open-loop person to person payments, the method comprising:

receiving, at a person to person (P2P) payments platform, a transaction request message from a sender computing device, the transaction request message including an identifier of a recipient, details of a funding source, and a payment amount;

searching, by the P2P payments platform, in a database, for an account associated with the identifier of the recipient;

determining, by the P2P payments platform, based on the search in the database, that the recipient does not have an account registered with the P2P payments platform;

initiating, by the P2P payments platform, a request to a payment network, to transfer the payment amount from the funding source to an escrow account maintained at an acquirer system;

recording, by the P2P payments platform, an entry to the database, the entry having details of the transfer, which include a timestamp, a transaction identifier, the identifier of the recipient, the details of the funding source, and the payment amount;

transmitting, by the P2P payments platform, to the sender computing device, a notification indicating transfer of the payment amount to the escrow account;

transmitting, by the P2P payments platform, to the recipient based on the identifier, a payment notification message, said payment notification message including a link, wherein the link is a URL (uniform resource locator) specific to a payment webpage of the P2P payment platform, which includes an option for the recipient to receive the payment amount, the option being for a virtual card, issued by the acquirer system, to the recipient to receive the payment amount from the escrow account into an account associated with the virtual card without the recipient pre-registering;

determining, by the P2P payments platform, that the recipient has not completed receipt of the payment amount from the escrow account within a predetermined timeout period, based on the timestamp; and in response to determining that the recipient has not completed receipt of the payment amount from the escrow account within the predetermined timeout period, initiating, by the P2P payments platform, based on the entry in the database, a request to the payment network to transfer the payment amount from the escrow account back to the funding source.

2. The method according to claim 1, wherein the identifier of the recipient is determined by scanning, with the sender computing device, an optical code that encodes at least the identifier of the recipient.

3. The method according to claim 2, wherein the optical code also encodes a URL of a payment webpage of the P2P payments platform.

4. The method according to claim 1, wherein the identifier of the recipient is a mobile phone number, an email address, or an account identifier for the recipient at a messaging service.

5. A system for open-loop person-to-person payments, comprising:
a person to person (P2P) payments platform that is configured to:
receive, from a sender computing device, a transaction request message including an identifier of a recipient, details of a funding source, and a payment amount;
search a database for an account associated with the identifier of the recipient;
determine, based on the search in the database, a registration status of the recipient;
responsive to a determination that the recipient is registered:
determine, from the identifier of the recipient, an account of the recipient; and
initiate a request to a payment network to transfer the payment amount from the funding source to the account of the recipient;
responsive to a determination that the recipient is unregistered:
initiate a request to the payment network to transfer the payment amount from the funding source to an escrow account maintained at an acquirer system;
record an entry to the database, the entry having details of the transfer, which include a timestamp, a transaction identifier, the identifier of the recipient, the details of the funding source, and the payment amount; and transmit, to the recipient based on the identifier, a payment notification message, said payment notification message including a link, wherein the link is a URL (uniform resource locator) specific to a payment webpage of the P2P payment platform, which includes an option for the recipient to receive the payment amount, the option being for a virtual card, issued by the acquirer system, to the recipient to receive the payment amount from the escrow account into an account associated with the virtual card without the recipient pre-registering; and determine whether the recipient has completed receipt of the payment amount from the escrow account within a predetermined timeout period, based on the timestamp; and in response to a determination that the recipient has not completed receipt of the payment amount from the escrow account within the predetermined timeout period, initiate a request to the payment network, based on the entry in the database, to transfer the payment amount from the escrow account back to the funding source.

6. The system according to claim 5, wherein the P2P payments platform is further configured, in response to an indication from the recipient, within the predetermined timeout period, to initiate a transfer of the payment amount from the escrow account to the account associated with the virtual card, based on the entry in the database, and to provision the virtual card to the recipient.

7. The system according to claim 5, wherein the identifier of the recipient is a mobile phone number, an email address, or an account identifier for the recipient at a messaging platform.

8. The system according to claim 5, further comprising the sender computing device.

9. The system according to claim 8, wherein the sender computing device is configured to determine the identifier of the recipient by scanning an optical code that encodes the identifier of the recipient.

10. The system according to claim 9, wherein the optical code also encodes a URL of a payment webpage of the P2P payments platform.

\* \* \* \* \*